United States Patent
Gottumukkala et al.

(10) Patent No.: US 7,917,555 B2
(45) Date of Patent: Mar. 29, 2011

(54) CREATING, STORING AND VIEWING PROCESS MODELS

(75) Inventors: Ramakanthachary S. Gottumukkala, Sammamish, WA (US); Josh W. Honeyman, Bellevue, WA (US); Madan Gopal Natu, Redmond, WA (US); Michael V. Ehrenberg, Seattle, WA (US); Nicholas Justin Lowe, Mercer Island, WA (US); Thomas Emil Jensen, Copenhagen (DK); Cary Rohwer, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 970 days.

(21) Appl. No.: 11/287,547

(22) Filed: Nov. 23, 2005

(65) Prior Publication Data
US 2006/0200476 A1 Sep. 7, 2006

Related U.S. Application Data

(60) Provisional application No. 60/658,130, filed on Mar. 3, 2005.

(51) Int. Cl.
*G06F 17/30* (2006.01)
(52) U.S. Cl. ........................ 707/953; 707/956
(58) Field of Classification Search ............ 707/3, 8, 707/9, 10, 100, 101, 953, 955, 802, 803, 707/804; 715/839, 765; 705/7
See application file for complete search history.

(56) References Cited

U.S. PATENT DOCUMENTS

| 5,765,140 | A | 6/1998 | Knudson et al. |
| 6,023,765 | A | 2/2000 | Kuhn |
| 6,067,548 | A | 5/2000 | Cheng |
| 6,101,481 | A | 8/2000 | Miller |
| 6,601,233 | B1 | 7/2003 | Underwood |
| 6,678,714 | B1 | 1/2004 | Olapurath et al. |
| 6,748,582 | B1 | 6/2004 | Chiles et al. |
| 6,797,624 | B2 * | 9/2004 | Lee .............................. 438/692 |
| 6,850,895 | B2 | 2/2005 | Brodersen et al. |
| 6,889,113 | B2 * | 5/2005 | Tasker et al. .................. 700/180 |
| 6,944,622 | B1 | 9/2005 | Mitchell et al. |
| 6,968,314 | B1 | 11/2005 | White et al. |
| 7,110,957 | B2 | 9/2006 | Barnard et al. |
| 7,113,923 | B1 | 9/2006 | Brichta et al. |
| 7,149,700 | B1 | 12/2006 | Munoz et al. |
| 7,197,740 | B2 | 3/2007 | Beringer et al. |
| 7,207,004 | B1 * | 4/2007 | Harrity ........................ 715/236 |

(Continued)

FOREIGN PATENT DOCUMENTS
EP  1 001 337 A2  5/2000

OTHER PUBLICATIONS

Michael C. Greenbaum of Blank Rome LLP. "Prior Work by Others Relevant to Microsoft Patent Applications." Sep. 2, 2008. 2 pages.

(Continued)

*Primary Examiner* — Jean M Corrielus
(74) *Attorney, Agent, or Firm* — Theodore M. Magee; Westman, Champlin & Kelly, P.A.

(57) ABSTRACT

The location of a drawing of an activity, a property of an element in the drawing and the structural relationship of elements in the drawing are stored in a database. The database is accessed to form a user interface that provides a hierarchical representation of activities and the elements within activities.

19 Claims, 14 Drawing Sheets

U.S. PATENT DOCUMENTS

| | | | |
|---|---|---|---|
| 7,260,510 B2 * | 8/2007 | Sumida | 703/2 |
| 7,290,256 B2 | 10/2007 | Anderson et al. | |
| 7,308,334 B2 * | 12/2007 | Tasker et al. | 700/180 |
| 7,406,432 B1 | 7/2008 | Motoyama | |
| 7,418,448 B2 | 8/2008 | Hensel et al. | |
| 7,463,648 B1 * | 12/2008 | Eppstein et al. | 370/468 |
| 7,484,183 B2 * | 1/2009 | Look et al. | 715/839 |
| 7,516,110 B2 * | 4/2009 | Spector et al. | 706/45 |
| 7,548,925 B2 * | 6/2009 | Bradlee et al. | 707/100 |
| 7,610,575 B2 | 10/2009 | Sproule | |
| 7,631,255 B2 * | 12/2009 | Weise et al. | 715/229 |
| 7,640,548 B1 | 12/2009 | Yu et al. | |
| 7,703,102 B1 * | 4/2010 | Eppstein et al. | 718/104 |
| 7,801,755 B2 | 9/2010 | Doherty et al. | |
| 2001/0053991 A1 | 12/2001 | Bonabeau | |
| 2002/0055924 A1 * | 5/2002 | Liming | 707/100 |
| 2002/0156644 A1 | 10/2002 | Davies et al. | |
| 2002/0156663 A1 | 10/2002 | Weber et al. | |
| 2002/0165898 A1 | 11/2002 | Duffy et al. | |
| 2003/0126136 A1 * | 7/2003 | Omoigui | 707/10 |
| 2003/0204431 A1 | 10/2003 | Ingman | |
| 2004/0078776 A1 | 4/2004 | Moon et al. | |
| 2004/0133876 A1 | 7/2004 | Sproule | |
| 2004/0176980 A1 | 9/2004 | Bulitta et al. | |
| 2004/0193428 A1 * | 9/2004 | Fruchter et al. | 704/276 |
| 2004/0220843 A1 | 11/2004 | Walter | |
| 2005/0091093 A1 | 4/2005 | Bhaskaran et al. | |
| 2005/0091260 A1 | 4/2005 | Carroll et al. | |
| 2005/0138420 A1 | 6/2005 | Sampathkumar et al. | |
| 2005/0198209 A1 | 9/2005 | Barrett | |
| 2005/0209899 A1 | 9/2005 | King et al. | |
| 2005/0209900 A1 | 9/2005 | Kettner et al. | |
| 2005/0278655 A1 | 12/2005 | Sims | |
| 2006/0047723 A1 | 3/2006 | Pomponio | |
| 2006/0085747 A1 * | 4/2006 | Morgan | 715/700 |
| 2006/0200476 A1 | 9/2006 | Gottumukkala et al. | |
| 2006/0200489 A1 | 9/2006 | Lowe et al. | |
| 2006/0200771 A1 | 9/2006 | Nielsen et al. | |
| 2006/0203849 A1 | 9/2006 | Bonar et al. | |
| 2008/0148413 A1 | 6/2008 | Brown et al. | |

OTHER PUBLICATIONS

Crawford, Alan, "Hard Slog Starting to Pay Off for Data Core," The Scotsman, Mar. 4, 1998, p. 1.

Procession, Delivers Performance Management Through a Process Application Development Platform, 1 page, Dec. 2004.

Smith, Mark, Ventana Research, "Procession Drives a Process of Change for Business," Jan. 24, 2004, Article ID: M04-04, pp. 1-2.

Thompson, Michael, "Business Process Management Technology Audit, Procession," Butler Group Subscription Services, Apr. 2004, pp. 1-8.

Kellett, Andy, "Business Process Management Research Paper, Procession V4.1," Research and Advisory Services, Mar. 2004, pp. 1-8.

Kellett, Andy, "Business Process Management Research Paper, Procession V4.1," Research and Advisory Services, Mar. 2002, pp. 1-8.

Collins et al., DataCore, "DataCore Limited rquirement Specification for Procession the Windows ProcessFlow Product," Issue 1.0, pp. 1-37 Feb. 27, 1996.

"Conspectus—The It Report for Decision Makers and Consultants," Conspectus Sep. 1997, 2 pages.

Dewan, Rajiv et al., Workflow Optimization Through Task Redesign in Business Information Processes, International Conference on System Sciences, 1998.

Anders, Morch, Tailoring tools for system development, Journal of End User Computing, vol. 10, No. 2, Spring 1998.

Harrington, James H., Business Process Improvement Workbook, McGraw-Hill, 1997, ISBN: 0-07-026779-0.

Tatsiopoulos, I.P., Requirements Analysis of Production Management Software Systems, Computer Integrated Manufacturing Systems, vol. 3, No. 4, Nov. 1990, Abstract.

Cheong, Yu Chye et al., Frame-based Method for Customizing Generic Software Architectures, ACM, SSR'99, 1999.

Microsoft Solutions Framework—White Paper, Microsoft, Jun. 2002.

Prosecution Documents Associated with U.S. Appl. No. 11/345,965 including: Office Action mailed Mar. 24, 2010, Response to Restriction Requirement filed Feb. 12, 2010, Restriction Requirement mailed Jan. 14, 2010.

Prosecution Documents Associated with U.S. Appl. No. 11/233,881 including: Final Office Action mailed Mar. 18, 2010, Amendment filed Dec. 23, 2009, Office Action mailed Sep. 24, 2009, Amendment with RCE filed Jul. 22, 2009.

Prosecution Documents Associated with U.S. Appl. No. 11/345,965 including: Amendment filed Jul. 12, 2010, Final Office Action mailed Aug. 3, 2010.

Prosecution Documents Associated with U.S. Appl. No. 11/233,881 including: Amendment with RCE filed May 12, 2010, Office Action mailed Jun. 7, 2010, Amendment filed Jul. 30, 2010.

Barka, Ezedin S., Framework for Role Based Delegation Models, George Mason University, Summer 2002.

Cassidy, Anita, A Practical Guide to Information Systems Process Improvement, CRC Press, 2000.

Cuppens, Frederic et al., Administration Model for Or-BAC In International Federated Conferences (OTM'03), Workshop on Metadata for Security, 2003.

Davis, William S., et al., The Information System Consultant's Handbook—Systems Analysis and Design CRC Press, Dec. 1998.

Kalam, Anas Abou et al., Organization based access control Proceeding of the 4th International Workshop on Policies for Distributed Systems and Networks, IEEE, 2003.

Oh, Sejong et al., A Model of Role Administration Using Organization Structure, SACMAT'02, 2002.

Oh, Sejong et al., Enterprise Model as a Basis of Administration on Role-Based Access Control, IEEE, 2001.

Oh, Sejong et al., Task-role based access control model, Information Systems, vol. 28, 2003.

Ryan, Hugh W. et al., Netcentric Computing, Anderson Consulting, Auerback, 1998.

Scheer, A.W., Business Process Engineering—The State of the Art of Business Process Redesign, Springer-Vertag, Secong Edition, 1994.

* cited by examiner

CREATING, STORING AND VIEWING PROCESS MODELS

CROSS-REFERENCE TO RELATED APPLICATION

The present application claims priority benefit of U.S. Provisional Application 60/658,130, filed on Mar. 3, 2005.

BACKGROUND

Business applications are computer programs that are designed to assist in performing one or more business tasks that form part of an overall business process. Before such applications can be written, a business analyst typically studies the business and creates a model of the processes used in the business.

Currently, the processes are documented using a technical drawing program such as Visio® produced by Microsoft Corporation. In particular, the technical drawing program is used to place shapes representing tasks, events, or decision points, and arrows that connect these shapes into a document to produce a flow diagram representing the process. While defining a business process in a technical drawing program is intuitive, it is difficult to access the information contained in the drawing without opening the technical drawing document. In addition, the amount of information about the elements in the process is quite limited.

The discussion above is merely provided for general background information and is not intended to be used as an aid in determining the scope of the claimed subject matter.

SUMMARY

The location of a drawing of an activity, a property of an element in the drawing and the structural relationship of elements in the drawing are stored in a database. The database is accessed to form a user interface that provides a hierarchical representation of activities and the elements within activities.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter

DETAILED DESCRIPTION

Figure 1:
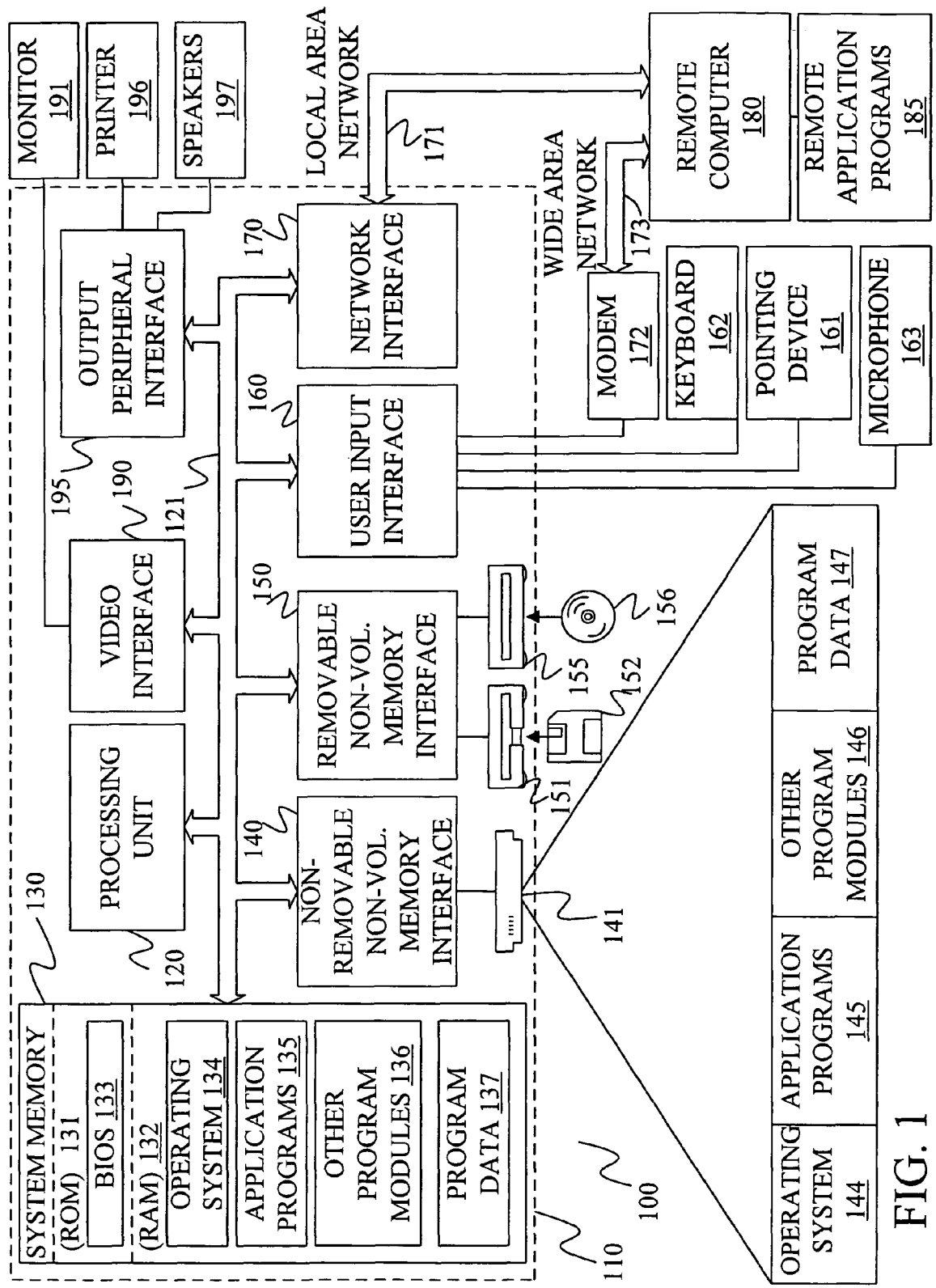
FIG. 1 is a block diagram of one computing environment in which some embodiments of the present invention may be practiced.

FIG. 1 illustrates an example of a suitable computing system environment 100 on which embodiments may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing some embodiments includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
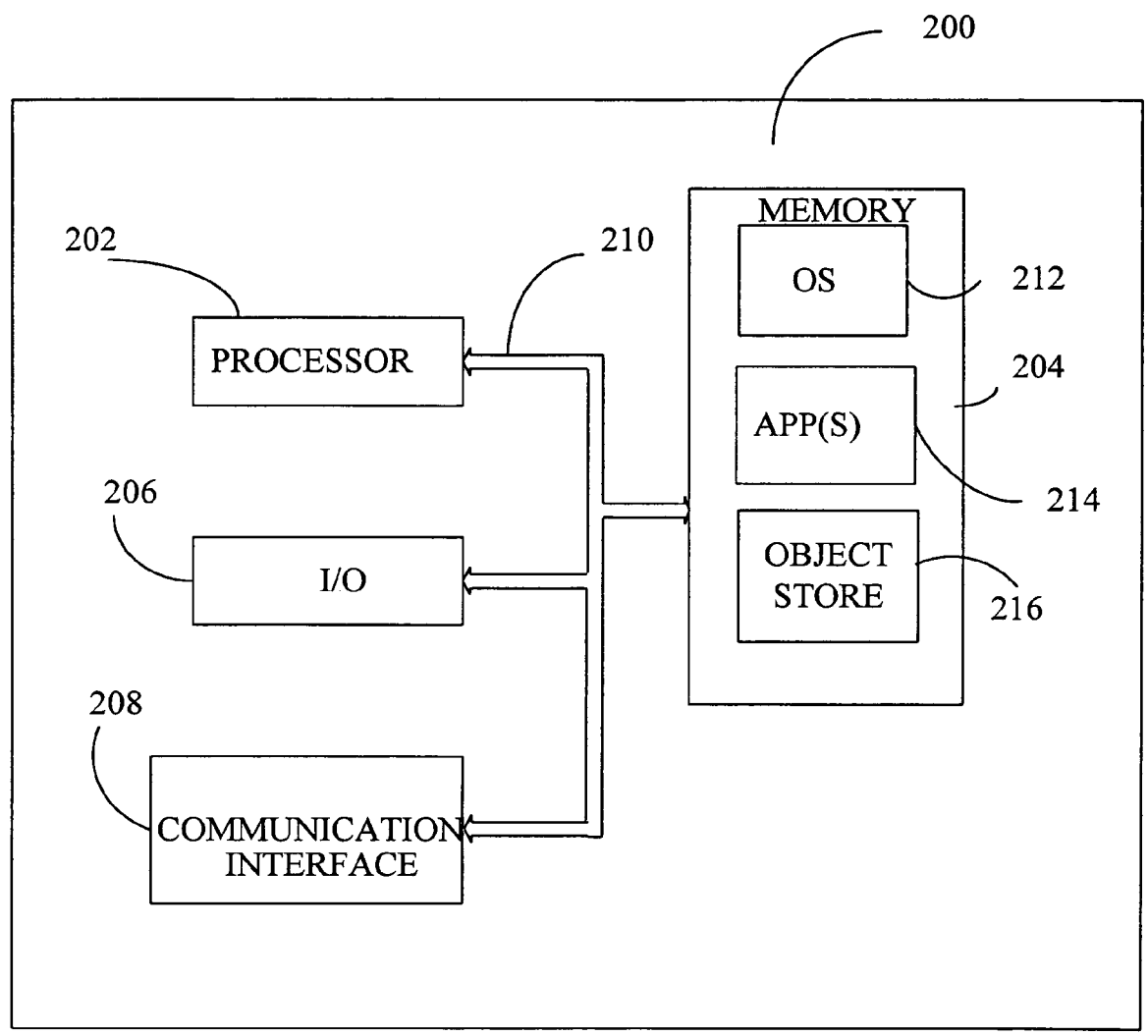
FIG. 2 is a block diagram of an alternative computing environment in which some embodiments of the present invention may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200.

A process modeling system is provided that allows business analysts to define business processes using a technical drawing program to draw the structures of the processes and to define metadata for elements in the processes. The structure, drawings and metadata are stored in a database that may be explored to produce a hierarchical view of the elements in the processes.

An activity diagram can be for a process, task or a step. Steps are the smallest measure of an activity and can be combined using events, gateways and flows to form a task. An event can trigger the processing of one or more steps or return a result after a series of steps. Gateways can either be used to direct the process down one of two flow paths or can be used to join two flow paths into a single path. Flows are connections between elements that indicate the flow of the process from one element to the next. Tasks are generally sequences of steps that are performed by a single persona or model user in a business. Sequences of tasks are joined together by events, gateways and flows to form a process. One process may be embedded in another process as a sub-process.

Figure 3:
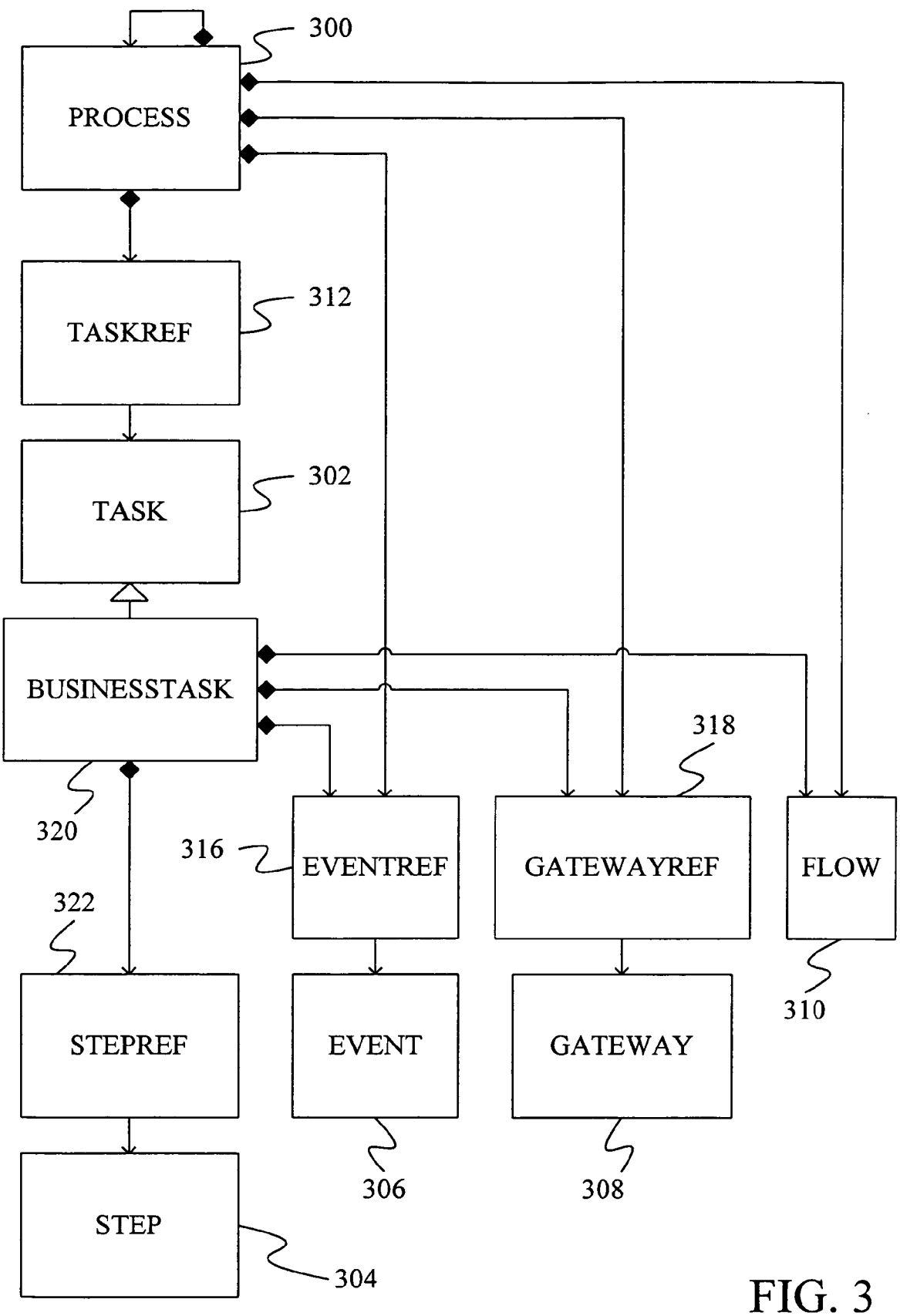
FIG. 3 is an object model of process elements.
Figure 4:
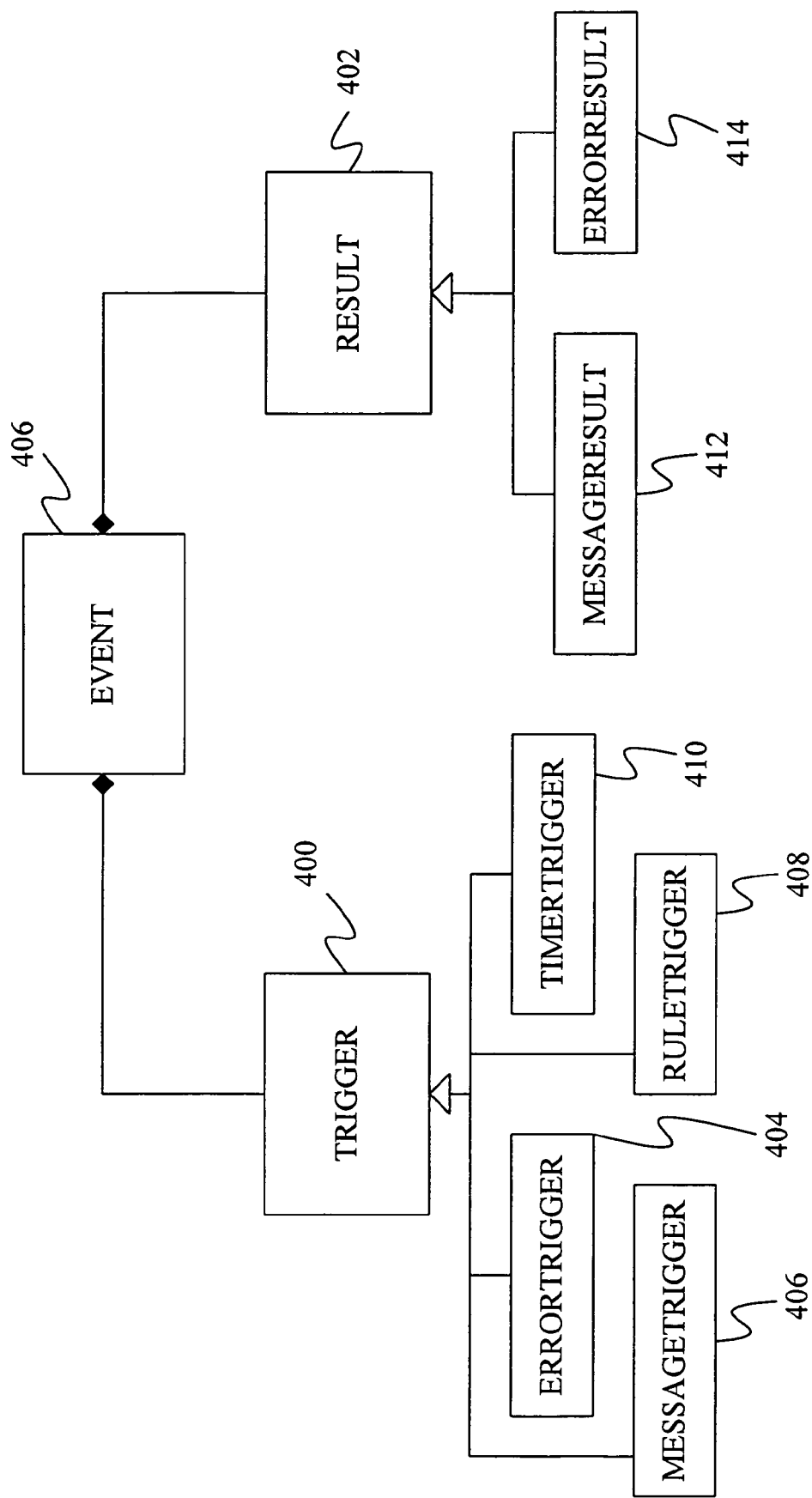
FIG. 4 is an object model of an event element.

FIGS. 3 and 4 provide an object model that describes how the elements of a process are interrelated in some embodiments. In this object model, a process is decomposed into tasks, events, gateways and flows. Tasks in turn are decomposed into steps, events, gateways and flows. In FIG. 3, the basic elements found in a process document are a process 300, task 302, steps 304, events 306, gateway 308, and flows 310. A step 304 is an individual action taken within a task. A sequence of steps that make up a task are connected together along with gateways 308 and events 306 by flows 310. Events 306 indicate the beginning or end of an activity or a pause in an activity that resumes after some trigger. Gateways 308 can either be decision junctions or join junctions. A decision junction provides an expression that is evaluated to determine which of two flow paths to follow after the gateway 308. A join gateway merges two or more flow connections together to form a single flow path to the next step. Flows 310 are connections between elements that indicate the flow of the process from one element to the next. Flows 310 that occur after a gateway 308 include a property for the value of the expression that will cause the process to follow the path represented by the flow.

Tasks 302 are generally sequences of steps that are performed by a single persona or model user in a business. Sequences of tasks 302 are joined together along with events 306 and gateways 308 by flows 310 to form a process 300. One process may be embedded in another process as a sub-process.

As shown in FIG. 3, processes 300 do not link directly to tasks 302, events 306 or gateways 308. Similarly, tasks do not link directly to steps 304, events 306 or gateways 308. Instead, processes 300 link to task references 312, event references 316, and gateway references 318. Task references 312, event references 316, and gateway references 318 in turn link to task 302, event 306, and gateway 308, respectively. Similarly, tasks, such as business task 320, link to step reference 322, event reference 316 and gateway reference 318, which in turn link to step 304, event 306, and gateway 308, respectively.

Task reference 312, step reference 322, event reference 316 and gateway reference 318 allow multiple activities to reference the same elements without repeating the properties of the elements in the database. It also allows an activity to be defined before the underlying elements have been fully defined. Thus, the process may be defined by placing a task reference, an event reference or a gate reference in the process and then later defining a task event or gateway to satisfy that reference.

FIG. 4 shows a more detailed object model for the event element 306 of FIG. 3. In FIG. 4, an event 306 can refer to a trigger 400 or a result 402. Examples of possible triggers include error trigger 404, message trigger 406, rule trigger 408 and timer trigger 410. An error trigger 404 triggers an event when an error occurs. A rule trigger 408 triggers an event when a rule expression is satisfied. A timer trigger 410 triggers an event when an elapsed time or a particular time occurs. A message trigger 406 triggers an event when a particular message is received. In FIG. 4, two types of results 402 are provided including a message result 412 and an error result 414. An error result 414 issues an error when event 406 is reached. Message result 412 issues a message when event 406 is reached.

Figure 5:
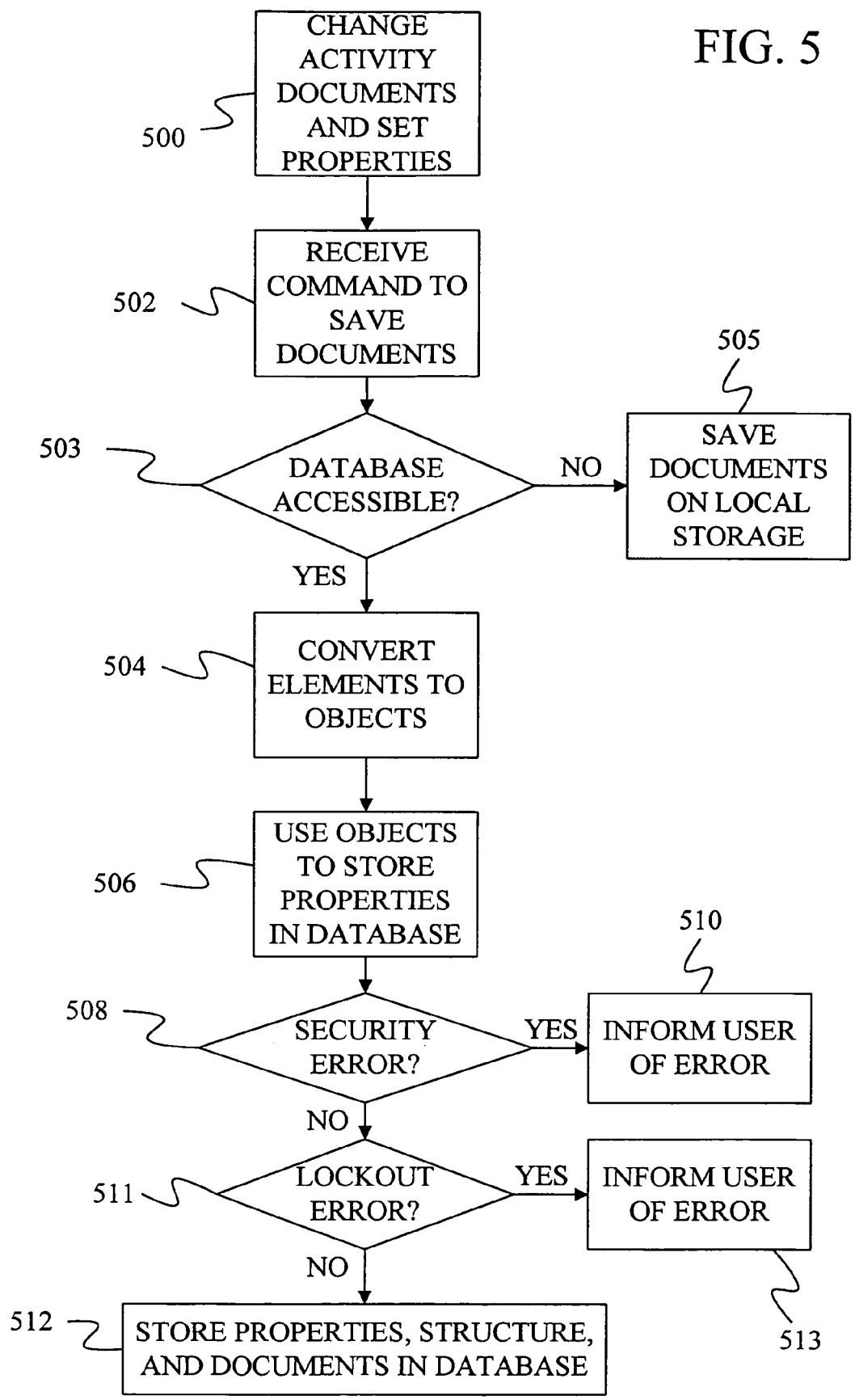
FIG. 5 is a flow diagram of a method of creating and storing activity documents with metadata.
Figure 6:
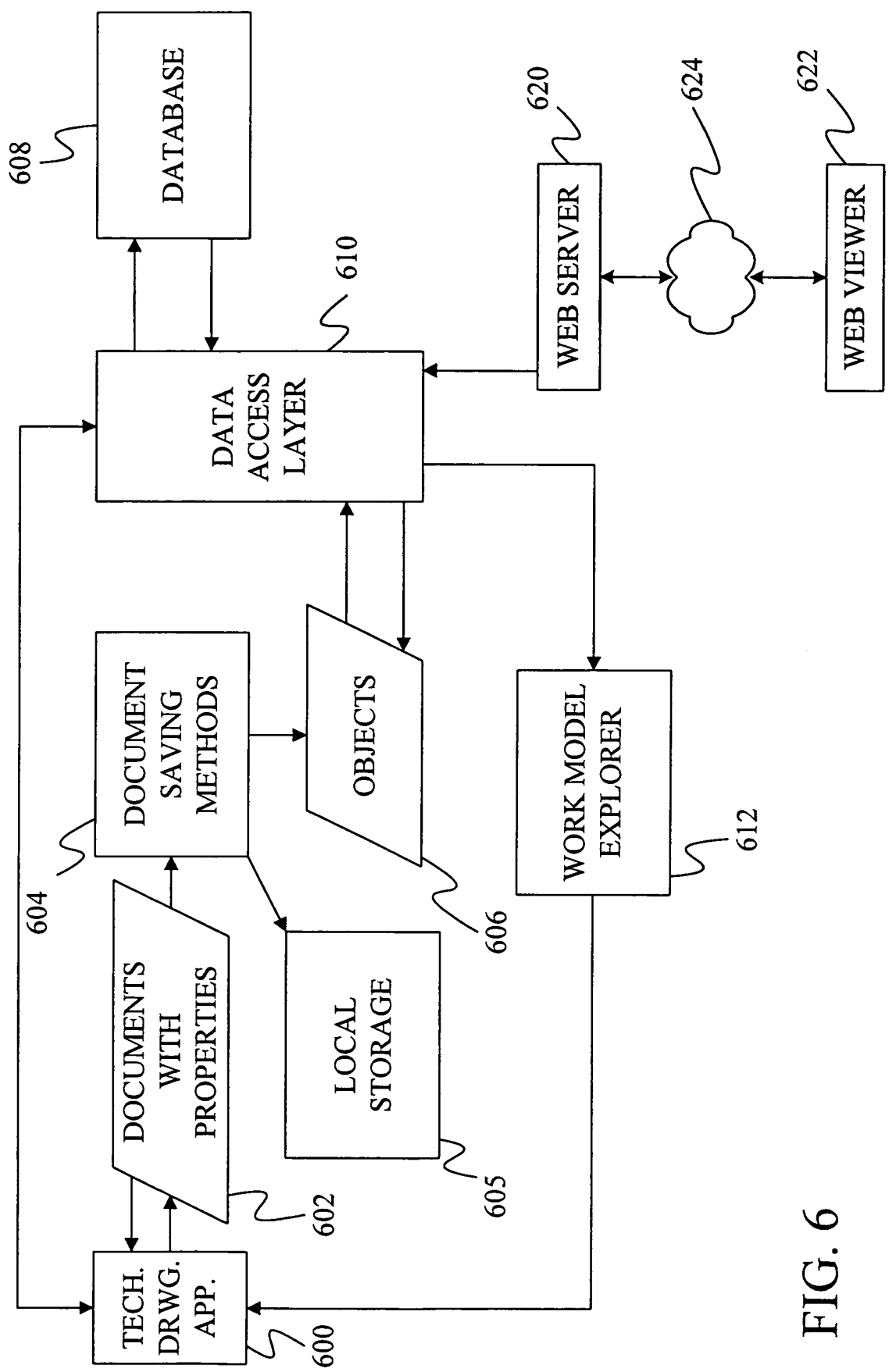
FIG. 6 is a block diagram of elements used to create and store activity documents, structures, and metadata.

FIG. 5 provides a flow diagram for creating and storing information about business activities including processes, tasks and steps. FIG. 6 provides a block diagram of elements used in the process of FIG. 5.

Figure 7:
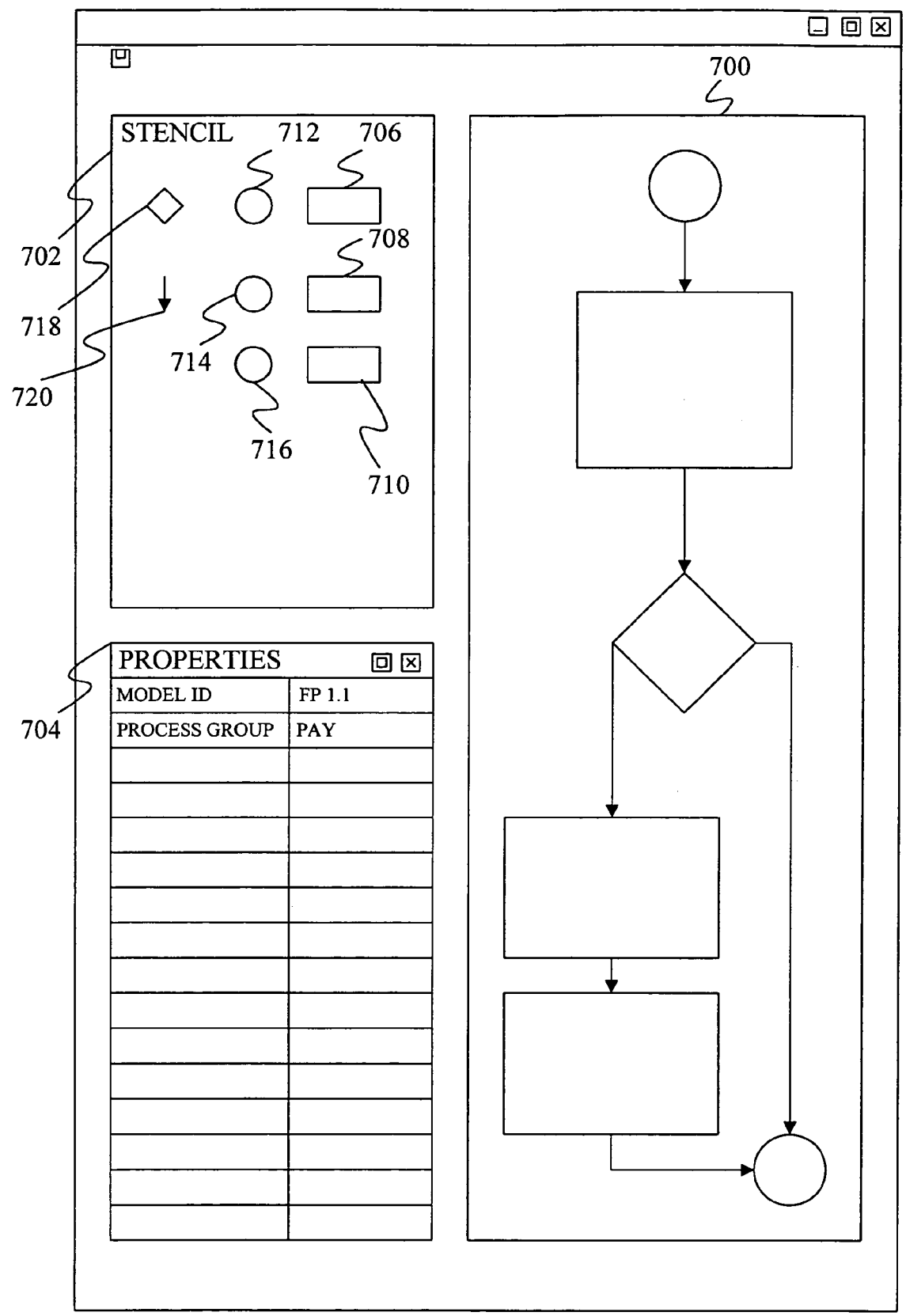
FIG. 7 is a sample screen shot of a technical drawing program for creating activity diagrams and related metadata.

At step 500 of FIG. 5, technical drawing application 600 of FIG. 6 is used to produce activity documents with properties 602. FIG. 7 provides an example user interface in a technical drawing application 600 that can be used to form the process documents and properties. In FIG. 7, a drawing pane 700, a stencil 702, and a properties pane 704 are shown. In some embodiments, templates are provided for drawing pane 700 with a separate template for processes, tasks, and steps.

Elements are added to drawing pane 700 from stencil 702, which includes selectable examples of elements that may be placed into drawing pane 700. For example, by placing the cursor on one of the elements in stencil 702, pressing a button on the mouse, and moving the mouse, the element in the stencil will be selected and dragged into a position on pane 700. When the mouse button is released, the element will be fixed in position in pane 700. Stencil 702 can include elements such as a sub-process box 706, a task box 708, a step box 710, a start event 712, an intermediate event 714, an end event 716, a decision gateway 718, and a sequence flow 720. Other elements may be provided in stencil 702, including multiple versions of the same type of element with different properties.

Properties pane 704 provides a list of metadata for a selected element in drawing pane 700. If no element within drawing pane 700 is selected, properties pane 704 includes metadata for the process, task, or step represented by the drawing document in pane 700. The element represented by the document, as well as each of the elements in the template, has a model ID. The model ID for an element uniquely identifies the element and the collection of metadata defined in the properties pane for the element.

Sub-processes, tasks, and steps that are found within another process or task are separately defined in another drawing document. The model ID for that drawing document corresponds to the model ID of the process, task, or step element in the parent document.

Elements that have been defined by setting certain metadata properties in properties pane 704 may be copied into other documents by selecting the element from a current document, copying the element using a copy command, and pasting the element into another document. If the model ID of the element is not changed when it is placed in the new document, both documents will reference the same element with the same collection of properties.

Figure 8:
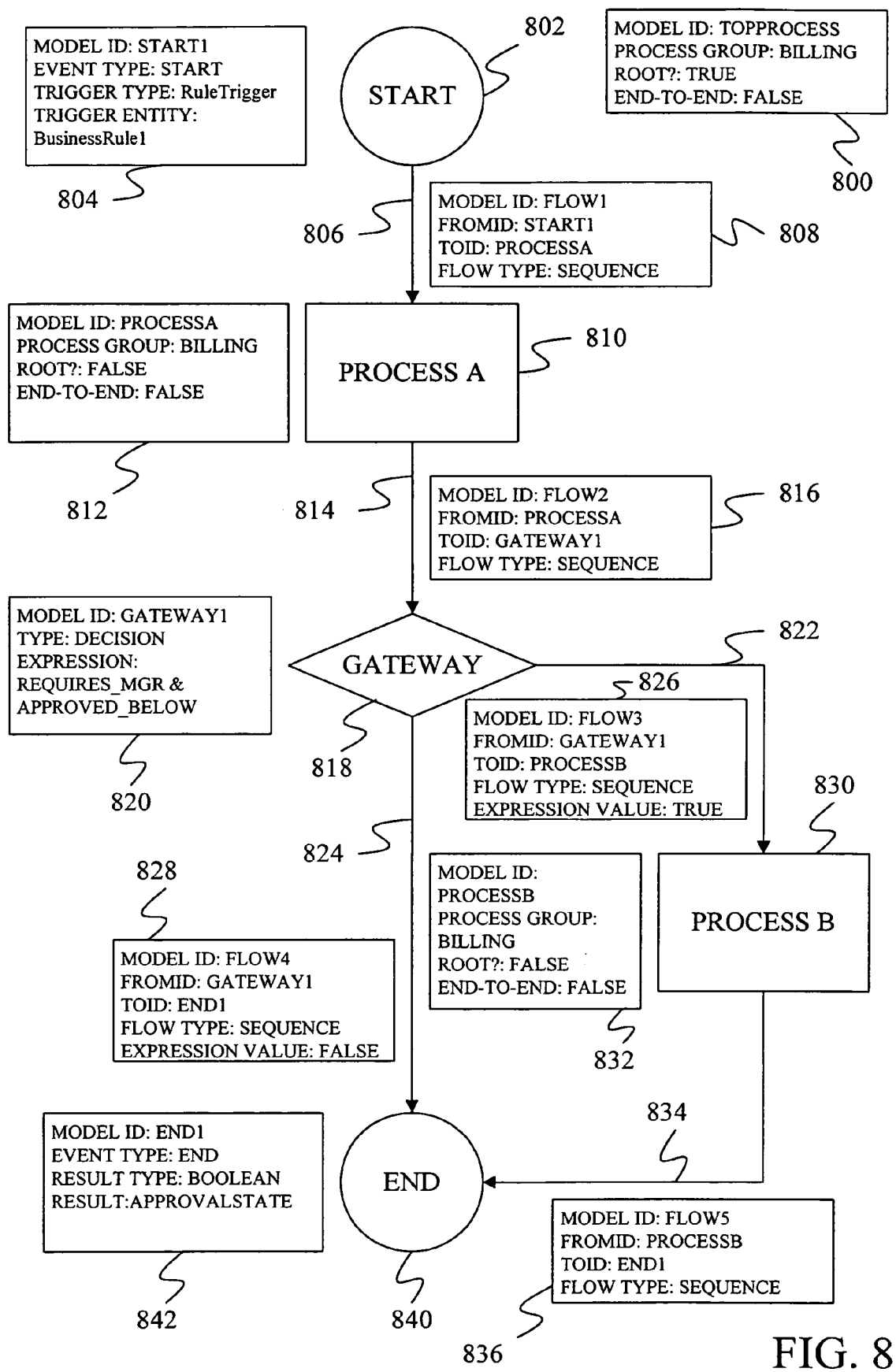
FIG. 8 is a sample process flow diagram with metadata.

FIG. 8 provides an example of a process diagram with associated metadata for a process with a model ID TOPPROCESS. In FIG. 8, the metadata for TOPPROCESS is metadata 900 and includes the model ID TOPPROCESS, a ROOT? parameter which is set to TRUE to indicate that this a root process for a process group and a process group parameter that is set equal to BILLING to indicate that this root process is part of the BILLING group. The process of FIG. 8 begins with start event 802, which has metadata 804. Metadata 804 includes a model ID of START1 and an event type of START. This start event is triggered by a RULE TRIGGER known as BusinessRule1. Thus, when the rule trigger BusinessRule1 is true, start event 802 is triggered.

Flow 806 extends from start event 802 and is defined by metadata 808. Metadata 808 indicates that flow 806 has a model ID of FLOW1, that it extends from the START1 and that it extends to a PROCESSA element. The metadata also indicates that this flow is a SEQUENCE flow.

Flow 806 extends to sub-process 810. Sub-process 810 has metadata 812 that indicates that the model ID for the sub-process is PROCESSA and that it is part of the BILLING process group. The metadata also indicates that process 810 is not a root process and as such is a sub-process. The metadata also indicates that process 810 is not an end-to-end process.

A flow 814 extends from process 810 and has metadata 816. Metadata 816 indicates that flow 814 has a model ID of FLOW2, that it extends from an element with a model ID of PROCESSA and that it extends to an element with a model ID of GATEWAY1. Metadata 816 further indicates that flow 814 is a sequence flow.

Flow 814 extends to gateway 818, which has metadata 820. Metadata 820 indicates that gateway 818 has a model ID of GATEWAY1 and is a DECISION type gateway. Metadata 820 also identifies an expression that is evaluated when the process reaches gateway 818. In particular, the expression is the combination of two Boolean values REQUIRES_MGR and APPROVED_BELOW. These two Boolean values are ANDed together in the expression. Two flows 822 and 824 extend from gateway 818. Flow 822 has metadata 826 and flow 824 has metadata 828.

Metadata 826 indicates that flow 822 has a model ID of FLOW3, that it extends from an element with model ID GATEWAY1 to an element with model ID PROCESSB and that it is a SEQUENCE flow. The EXPRESSION VALUE parameter of metadata 826 that flow 822 is followed when the expression in GATEWAY 818 has a value of TRUE.

Flow 822 extends to sub-process 830, which has metadata 832. Metadata 832 indicates that sub-process 830 has a model ID of PROCESSB, is a member of the BILLING process group, and is not a root process. Metadata 832 further indicates that process 830 is not an end-to-end process.

Flow 834 extends from process 830 and has metadata 836. Metadata 836 indicates that flow 834 has a model ID of FLOW5, that it extends from an element with a model ID of PROCESSB and extends to an element with a model ID END1. Metadata 836 further indicates that flow 834 is a SEQUENCE flow.

Metadata 828, for flow 824, which extends from gateway 818, indicates that flow 824 has a model ID of FLOW4, that it extends from an element with a model ID of GATEWAY1 and extends to an element with a model ID of END1 and that it is a SEQUENCE flow. Further, metadata 828 indicates that flow 824 is followed in the process when the expression in metadata 820 for gateway 818 is false.

Flows 824 and 834 end at end event 840, which has metadata 842. Metadata 842 indicates that end event 840 has a model ID of END1, and is an end type event. In addition, it indicates that end event 840 produces a MESSAGE result type that is called APPROVALSTATE.

As can be seen from the example above, the properties metadata includes properties of the elements such as Gateway Type, and Trigger Type as well as structural relationship information that describes how the elements of the process are structurally related to each other in the drawing.

Under one embodiment, the elements have the following properties:

| Shapes/ Diagram | Metadata Category | Property (Metadata) | Remarks/ Comments |
| --- | --- | --- | --- |
| Process and Subprocess | Workflow | ID | Coding based on MCT Guidelines. There will not be a shape for this. All the custom properties will be entered into the ThePage properties of the Visio diagram using the Work Model Process Template. The shape will have only "ID" for doing the association. |
| Process and Subprocess | Workflow | Name | Name of the subprocess attribute instance. For example, "Record Invoice". Should match the text on the shape. |
| Process and Subprocess | Workflow | Description | Additional description about the subprocess. |
| Process and Subprocess | Workflow | Loop Condition | Indicates the entire flow contained within a sub-process is repeated based on a loop condition. While the loop condition evaluates to true or until the loop condition evaluates to false, the sub-process is executed. |
| Process and Subprocess | Workflow | Ad Hoc | Indicates that the contained activities have no sequence. This means that the activities contained within an ad-hoc sub-process can be executed in any order with any frequency. |

-continued

| Shapes/ Diagram | Metadata Category | Property (Metadata) | Remarks/ Comments |
|---|---|---|---|
| | | | The order, frequency and completion of an ad-hoc sub-process are determined by the person who performs it. |
| Process and Subprocess | Business Logic | Process Class | A process classification that defines the processes's behavior and/or role in transforming process inputs into required outputs. This is needed at the sub-process, if we don't have a way to record this custom property information at the basic diagram level. |
| Process and Subprocess | Business Logic | Process Group | Work represented by a group of processes that transforms an input into an output to achieve a predefined, measurable business goal. This is needed at the sub-process, if we don't have a way to record this custom property information at the basic diagram level. |
| Process and Subprocess | Business Logic | Preconditions | State of an object after an event or message has been detected/received. |
| Process and Subprocess | Business Logic | Enabling factors | |
| Process and Subprocess | Business Logic | KPI | A predefined, quantifiable measurement that can help an organization measure progress towards its business goals. |
| Process and Subprocess | Business Logic | Department | |
| Process and Subprocess | Business Logic | Persona | Process Owner - input is MBS Persona |
| Process and Subprocess | Business Logic | Postconditions | |
| Process and Subprocess | Business Logic | Primary Input Entity | Abstract objects such as class definitions or schema that capture important Master data of an ERP system. Business data (i.e. attributes, fields, properties, rules and business logic with respect to the operation of the business entities) being exchanged in support of business processes. |
| Process and Subprocess | Business Logic | Input Type | To define if it is a single entity, or a collection |
| Process and Subprocess | Business Logic | Primary Output Entity | Abstract objects such as class definitions or schema that capture important Master data of an ERP system. Business data (i.e. attributes, fields, properties, rules and business logic with respect to the operation of the business entities) being exchanged in support of business processes. |
| Process and Subprocess | Business Logic | Output Type | To define if it is a single entity, or a collection |
| Process and Subprocess | Business Logic | Input Artifacts | An artifact that has been created by someone or some process. These are mostly system artifacts, such as forms and reports, which serve as inputs/outputs to a business process. |
| Process and Subprocess | Business Logic | Output Artifacts | An artifact that has been created by someone or some process. These are mostly system artifacts, such as forms and reports, which serve as inputs/outputs to a business process. |
| Process and Subprocess | Business Logic | User Defined Attribute 1 | Three User defined fields have been created for all shapes - for extensibility and product line specific requirements |
| Process and Subprocess | Business Logic | User Defined Attribute 2 | |
| Process and Subprocess | Business Logic | User Defined Attribute 3 | |
| Task | Workflow | ID | The Custom Properties will be defined on the ThePage rather than the shape of the Visio diagram using the Work Model Task template.. The shape will have only "ID" for doing the association with the parent process element. |
| Task | Workflow | Name | Name of the task attribute. For example, "Post bank deposit". Should match the text on the shape. |
| Task | Workflow | Description | Additional description about the task. |
| Task | Workflow | Loop Condition | Indicates the entire flow contained within a task is repeated based on a loop condition. While the loop condition evaluates to true or |

-continued

| Shapes/ Diagram | Metadata Category | Property (Metadata) | Remarks/ Comments |
|---|---|---|---|
| Task | Workflow | Ad Hoc | until the loop condition evaluates to false, the task is executed. Indicates that the contained activities have no sequence. This means that the activities contained within an ad-hoc sub-process can be executed in any order with any frequency. The order, frequency and completion of an ad-hoc sub-process are determined by the person who performs it. |
| Task | Workflow | Task Type | Work Item is manual or else it is business task (Automated or semi-automated) |
| Task | Workflow | Approval | Indicates the ability for the end user of the system to add an approval around the task. Placement of the approval needs to be specified (before or after the task). |
| Task | Workflow | Schedulable | The ability for the end user of the system to schedule the activity. |
| Task | Workflow | Required | Within the sub-process flow, the task must be completed if Required is True. |
| Task | Business Logic | Persona | MBS persona Need the ability to assign multiple personas |
| Task | Business Logic | Preconditions | |
| Task | Business Logic | KPI | |
| Task | Business Logic | Postconditions | |
| Task | Business Logic | Primary Input Entity | Abstract objects such as class definitions or schema that capture important Master data of an ERP system. Business data (i.e. attributes, fields, properties, rules and business logic with respect to the operation of the business entities) being exchanged in support of business processes. |
| Task | Business Logic | Input Type | To define if it is a single entity, or a collection |
| Task | Business Logic | Primary Output Entity | Abstract objects such as class definitions or schema that capture important Master data of an ERP system. Business data (i.e. attributes, fields, properties, rules and business logic with respect to the operation of the business entities) being exchanged in support of business processes. |
| Task | Business Logic | Output Type | To define if it is a single entity, or a collection |
| Task | Business Logic | Input Artifacts | An artifact that has been created by someone or some process. These are mostly system artifacts, such as forms and reports, which serve as inputs/outputs to a business process. |
| Task | Business Logic | Output Artifacts | An artifact that has been created by someone or some process. These are mostly system artifacts, such as forms and reports, which serve as inputs/outputs to a business process. |
| Task | Business Logic | Priority | |
| Task | Business Logic | Due Date | |
| Task | Business Logic | User Defined Attribute 1 | |
| Task | Business Logic | User Defined Attribute 2 | |
| Task | Business Logic | User Defined Attribute 3 | |
| Step | Workflow | ID | The properties will be entered and saved on the shape's custom properties. |
| Step | Workflow | Name | Name of the step attribute. For example, "Enter PO requirements". Should match the text on the shape. |
| Step | Workflow | Description | Additional description about the step. |
| Step | Workflow | Step Type | Manual is used to identify a Step that is performed outside the context of the system. |
| Step | Workflow | Required | Within the task flow, the step must be completed if Required is True. |
| Step | Workflow | Web Service ID | |
| Step | Business Logic | Persona | MBS persona Need the ability to assign multiple personas |
| Step | Business Logic | User Defined Attribute 1 | |
| Step | Business Logic | User Defined Attribute 2 | |
| Step | Business Logic | User Defined Attribute 3 | |
| Start Event | Workflow | ID | |
| Start Event | Workflow | Name | |
| Start Event | Workflow | Description | |

-continued

| Shapes/Diagram | Metadata Category | Property (Metadata) | Remarks/Comments |
|---|---|---|---|
| Start Event | Workflow | Multi Event | |
| Start Event | Workflow | Trigger Type | |
| Start Event | Workflow | Trigger | Data Type of this field is "Text". Mandatory setting requires that Trigger Type is other than None. |
| Start Event | Workflow | Trigger Entity Type | |
| Start Event | Workflow | Trigger Entity | |
| Start Event | Business Logic | User Defined Attribute 1 | |
| Start Event | Business Logic | User Defined Attribute 2 | |
| Start Event | Business Logic | User Defined Attribute 3 | |
| Intermed. Event | Workflow | ID | |
| Intermed. Event | Workflow | Name | |
| Intermed. Event | Workflow | Description | |
| Intermed. Event | Workflow | Multi Event | |
| Intermed. Event | Workflow | Trigger Type | |
| Intermed. Event | Workflow | Trigger | Data Type of this field is "Text". Mandatory setting requires that Trigger Type is other than None. |
| Intermed. Event | Workflow | Trigger Entity Type | |
| Intermed. Event | Workflow | Trigger Entity | |
| Intermed. Event | Business Logic | User Defined Attribute 1 | |
| Intermed. Event | Business Logic | User Defined Attribute 2 | |
| Intermed. Event | Business Logic | User Defined Attribute 3 | |
| End Event | Workflow | ID | |
| End Event | Workflow | Name | |
| End Event | Workflow | Description | |
| End Event | Workflow | Multi Event | |
| End Event | Workflow | Result Type | |
| End Event | Workflow | Result | Data Type of this field is "Text". Mandatory setting requires that Result Type is other than None. |
| End Event | Workflow | Result Entity Type | |
| End Event | Workflow | Result Entity | |
| End Event | Business Logic | User Defined Attribute 1 | |
| End Event | Business Logic | User Defined Attribute 2 | |
| End Event | Business Logic | User Defined Attribute 3 | |
| Gateway | Workflow | ID | Gateway/Condition or Business Rule |
| Gateway | Workflow | Name | |
| Gateway | Workflow | Description | |
| Gateway | Workflow | Gateway Category | |
| Gateway | Workflow | Gateway Type | |
| Gateway | Business Logic | User Defined Attribute 1 | |
| Gateway | Business Logic | User Defined Attribute 2 | |
| Gateway | Business Logic | User Defined Attribute 3 | |
| Sequence Flow | Workflow | ID | |
| Sequence Flow | Workflow | Name | |
| Sequence Flow | Workflow | Description | |
| Sequence Flow | Workflow | Synchronous | |
| Sequence Flow | Workflow | Flow Type | |
| Sequence Flow | Workflow | Condition | |
| Sequence Flow | Business Logic | User Defined Attribute 1 | |
| Sequence Flow | Business Logic | User Defined Attribute 2 | |
| Sequence Flow | Business Logic | User Defined Attribute 3 | |
| Message Flow | Workflow | ID | |
| Message Flow | Workflow | Name | |
| Message Flow | Workflow | Description | |
| Message Flow | Workflow | Synchronous | |
| Message Flow | Workflow | Message Document Type | |
| Message Flow | Workflow | Message Document | |
| Message Flow | Business Logic | User Defined Attribute 1 | |
| Message Flow | Business Logic | User Defined Attribute 2 | |
| Message Flow | Business Logic | User Defined Attribute 3 | |

When the user wishes to save an activities document, they invoke the save command at step 502 of FIG. 5. Based on this save command, a document saving method 604 is invoked. At step 503, document saving method 604 determines if a database 608 is accessible. If the database is not accessible, the activity document and the associated properties of the elements are stored to a local storage device 605 at step 505. This allows users to save changes to activity documents when working "offline" and allows analysts and developers to make changes to documents even when they do not have access to the database.

If the database is accessible at step 503, the document saving method instantiates objects for each element in the process document at step 504. These objects contain properties that correspond to the properties found in properties pane 704. Saving methods 604 set the properties of objects 606 based on the property values found in property pane 704.

At step 506, objects 606 are used to store the metadata, which includes structural relationships between elements and other properties of the elements, and the location of the activity document in a database 608 using a data access layer 610. In particular, methods within objects 606 are used to store the metadata of the objects in database 608.

Database 608 includes a security layer that verifies whether the current user has write access to the activity documents that are being saved at step 508. If the user does not have write access, a security error will be generated. In response to this security error, saving methods 604 will produce a dialog box at step 510 informing the user that they do not have permission to change the activity document.

If database 608 determines that the user has write access to the activity document, database 608 then determines if changes to the activity document have been locked out at step 511. Changes to an activity document may be locked out if another user has checked out the activity document from the database. This prevents users from making conflicting changes to the activity document and allows managers to capture a final version of the activity document. If the activity document is locked out, the user is notified at step 513 and the changes are not saved to the database.

If database 608 determines that the activity document is not locked out at step 511, the activity document and the metadata for the elements in the document are stored at step 512. Storing the activity document involves storing the document to a storage device and recording the location of the document in database 608.

As shown above, programming objects 606 are used to store the metadata of the activity documents. In particular, the properties of programming objects 606 are set to the properties of the metadata of the elements in the activity document before being stored to database 608. The elements in an activity document share many common properties including the model ID property. In addition, the objects that represent these elements support many of the same methods including to the methods used to store the elements in the database.

Figure 9:
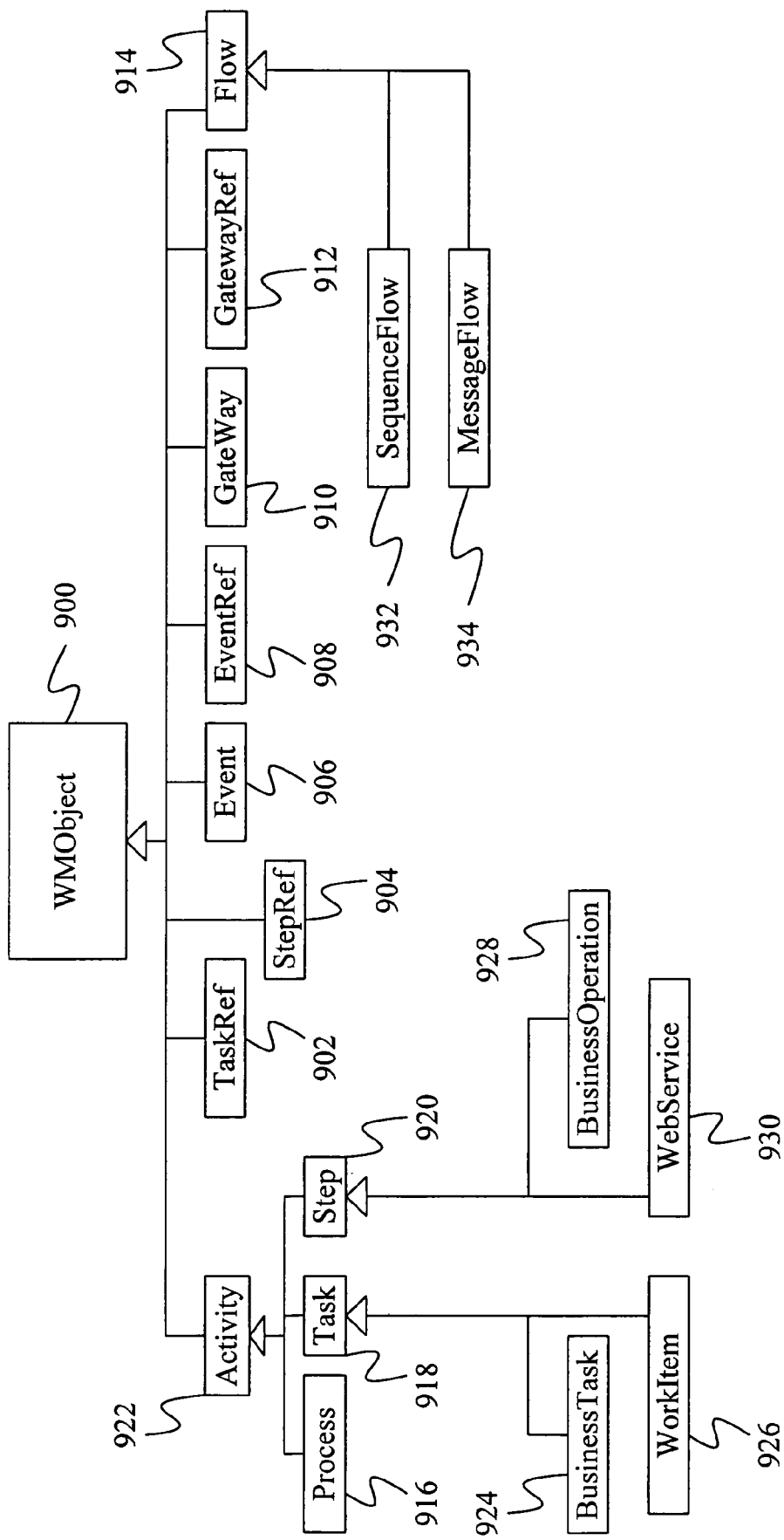
FIG. 9 is a programming object model.

FIG. 9 provides a programming object model that shows how the programming objects that represent the elements in a process inherit methods and properties from other objects. In FIG. 9, WMOBJECT 900 contains the properties and methods that are shared between all of the elements found in any of the activity documents. Task reference 902, step reference 904, event 906, event reference 908, gateway 910, gateway reference 912 and flow 914 all inherit directly from WMOBJECT 900. Process 916, task 918, and step 920 inherit from an activity object 922 that inherits from WMOBJECT 800. Thus, properties and methods that are common to process 916, task 918, and step 920 are found in activity 922.

Business task object 924 and work item object 926 inherit from task 918. Business operation object 928 and web service object 930 inherit from step object 920. Sequence flow object 932 and message flow object 934 inherit from flow object 914.

Figure 10:
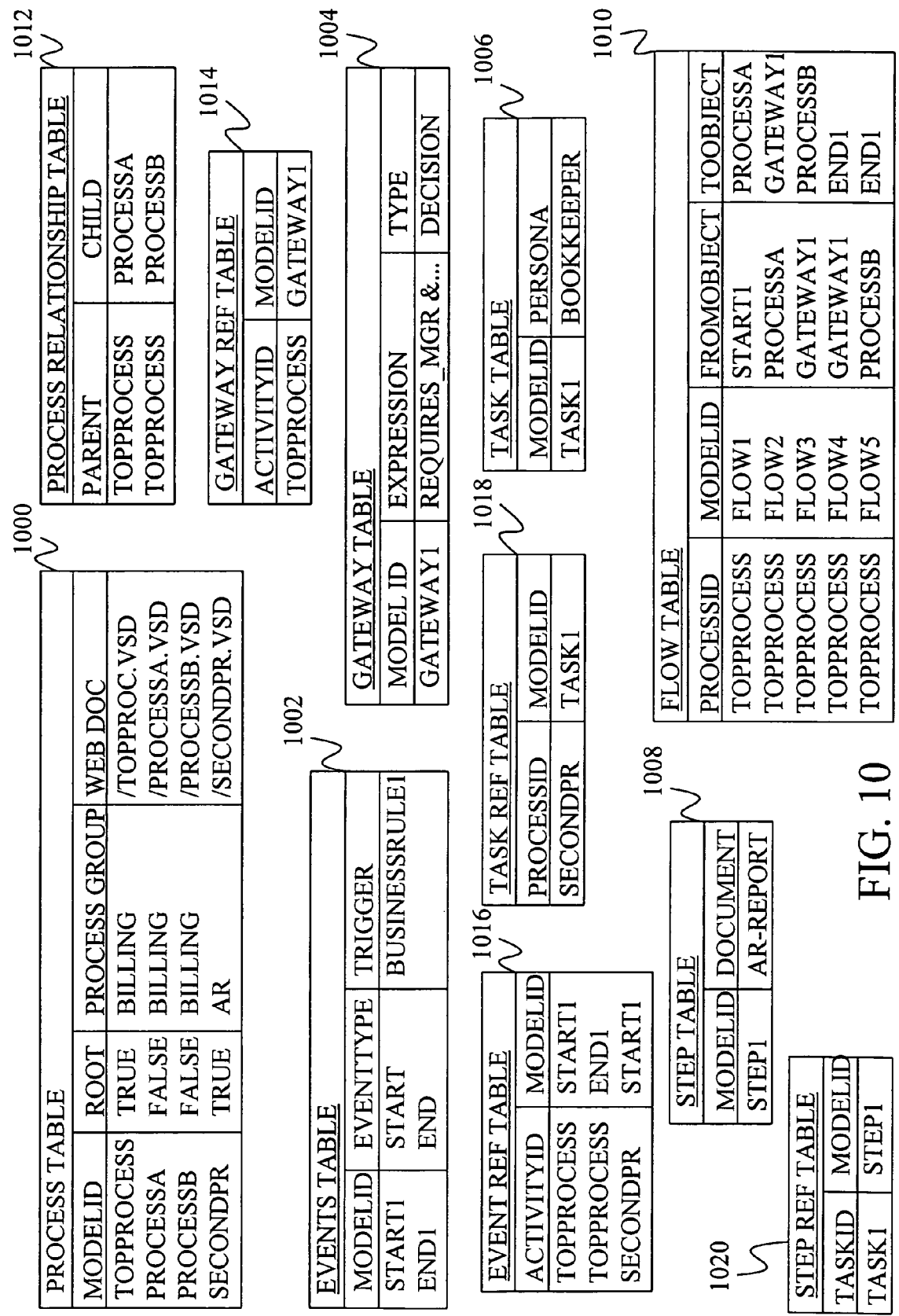
FIG. 10 is a collection of tables found in a database storing a process structure, diagrams and metadata.

FIG. 10 provides an example of tables found in database 608 with entries corresponding to the process of FIG. 8 having been stored in database 608. FIG. 10 includes process table 1000, events table 1002, gateway table 1004, task table 1006, step table 1008, flow table 1010, process relationship table 1012, gateway ref table 1014, event ref table 1016, task ref table 1018, and step ref table 1020.

Process table 1000 includes a row entry for every process defined in the system. Each entry includes properties for the process such as model ID, an indication of whether the process is a root process, the process group for the process, and a location for the corresponding drawing document. For example, the process in the first entry of process table 1000 has a model ID of TOPPROCESS, it is indicated as being a root process and as being part of the BILLING process group. Further, the drawing document for the process is found at \topproc.vsd.

Events table 1002 includes an entry for each event defined in any activity document. Each entry in events table 1002 includes properties for the event such as the model ID, an event type, which indicates what type of event is represented by the entry, and a trigger for the event. For example, the first entry in events table 1002 is for an event with a model ID of START1 that is a START type event that is triggered by the BUSINESSRULE1 trigger.

Gateway table 1004 provides an entry for each gateway in the system. Each entry in gateway table 1004 includes information such as a model ID for the gateway, an expression that indicates the expressions to be evaluated at the gateway, and the gateway type.

Task table 1006 provides a separate entry for each task defined in the activity documents. Each entry in the task table includes properties of the task such as model ID and the persona responsible for the task.

Step table 1008 provides a separate entry for each step found in the activity documents. Each entry in the step table includes a properties of the step such as model ID and a document used during the step.

Although certain properties are shown in process table 1000, events table 1002, gateway table 1004, task table 1006 and step table 1008, those skilled in the art will recognize that a separate field is provided in each of these tables for each property defined for the respective element in the object model.

Flow table 1010 provides an entry for every flow in the system. Flow table 1010 includes fields such as process ID to indicate which process the flow is found in, model ID, which indicates the model ID of the flow, FROMOBJECT, which indicates the model ID of the object the flow extends from and TOOBJECT, which indicates the model ID of the object that the flow extends to.

Process relationship table 1012 provides an entry for each occurrence of a sub-process in the activity documents. Each entry includes the model ID of the parent process and the sub-process and thus provides an association between the parent process and the sub-process.

Gateway Ref table 1014, Event Ref table 1016, Task Ref table 1018 and Step Ref table 1020 each provide an indirect link between a process or task and an element. Each table provides a field for the model ID of an activity in which the element is found and a field for the model ID of the element. For example, Gateway Ref table 1014 shows an entry that associates a gateway with model ID GATEWAY1 with an activity with a model ID of TOPPROCESS. This association is constructed based on the fact that the GATEWAY1 element was found within the drawing document of the TOPPROCESS process.

As shown in Event Ref table 1016, the indirect link provided by the Ref tables allow two separate activities to reference a same entry in an element table. In Event Ref table 10016, there are two entries for the START1 event. One entry has TOPPROCESS listed as the model ID of a process that contains the START1 event. A second entry has SECONDPR listed as a process that contains the START1 event. Thus, both entries refer to the same element, which is defined in a single entry in events table 1002.

Figure 11:
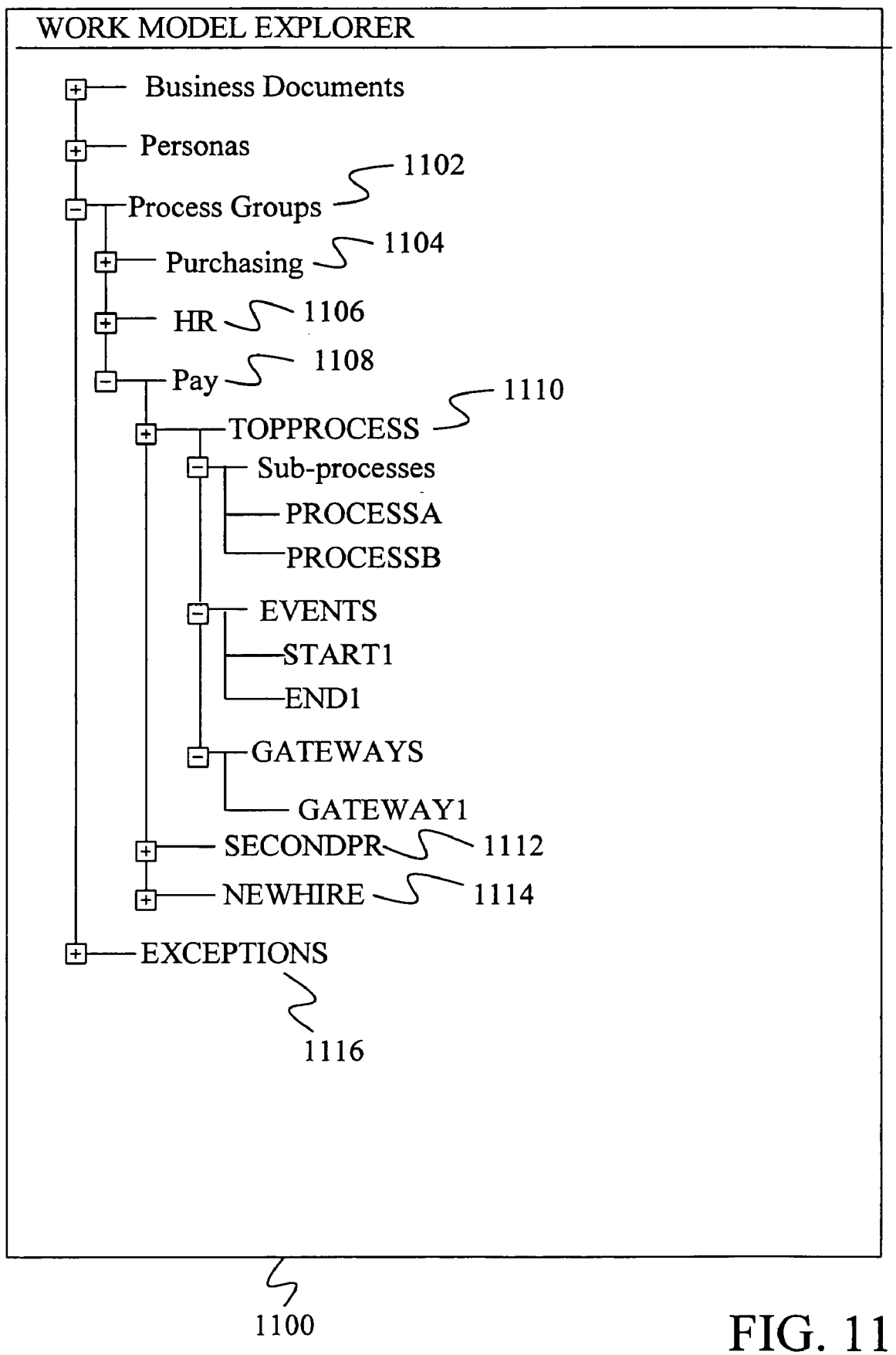
FIG. 11 is an example of a work model explorer user interface.

Once the data is stored in database 608, it may be used to generate a hierarchical display such as the one shown in user interface 1100 of FIG. 11. In FIG. 11, a work model explorer user interface is shown in which the root processes of the system are grouped together in process groups 1102 such as purchasing 1104, HR 1106 and pay 1108. In each process group, a set of processes are defined such as TOPPROCESS 1110, SECONDPR 1112, and NEW HIRE process 1114. If a sub-process is defined in the database but has not been associated with a root process, or a root process has not been associated with a group, the sub-process or process is grouped under an EXCEPTIONS heading 1116.

Figure 12:
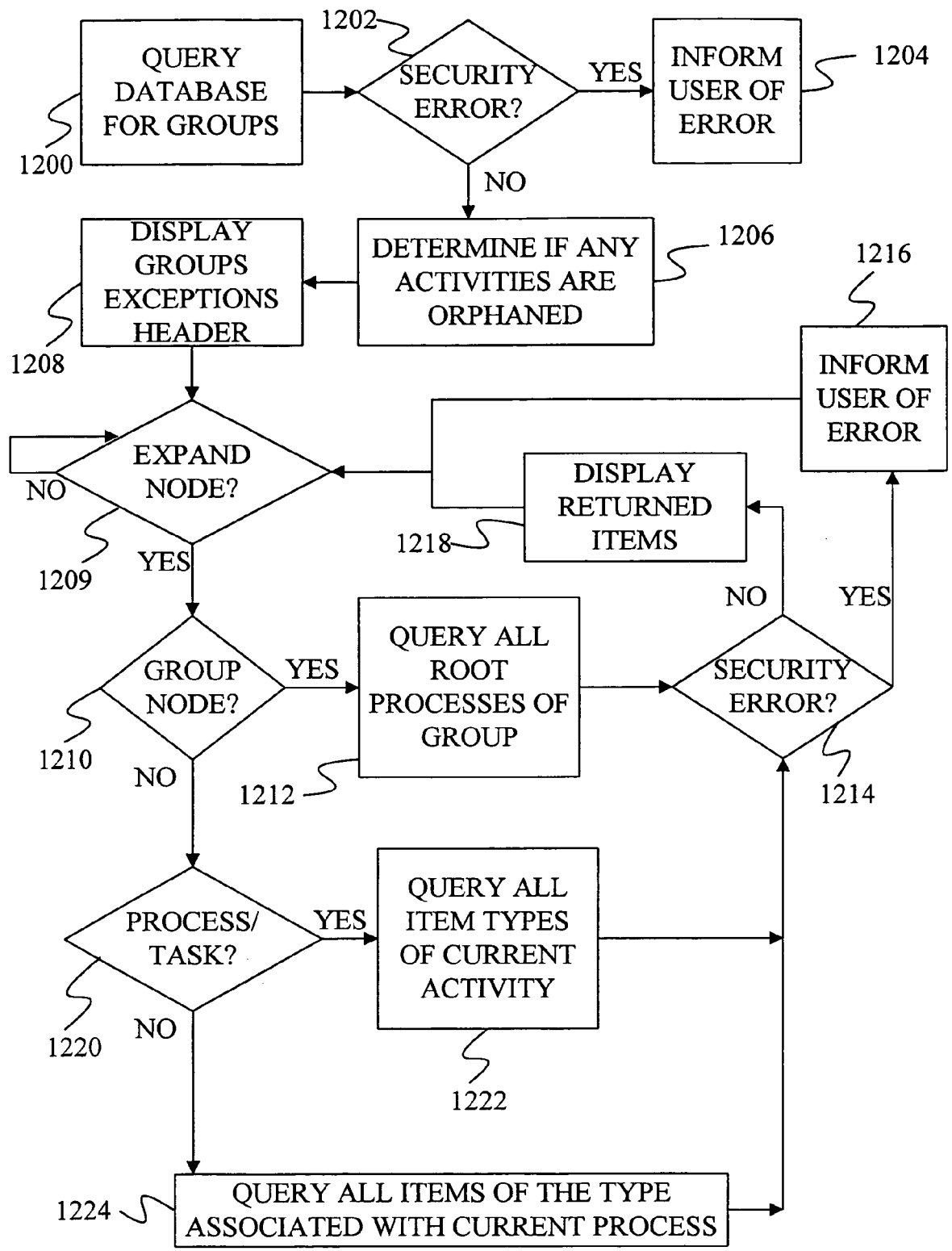
FIG. 12 is a flow diagram of a method for displaying a hierarchical view of process elements.

FIG. 12 provides a flow diagram of a method for generating work model explorer user interface 1100 of FIG. 11. In step 1200 of FIG. 12, work model explorer 612 of FIG. 6 uses data access layer 610 to query database 608 for all possible process groups defined in database 608. At step 1202, database 608 performs a security check to determine if the user has read access to the process system. If the user does not have read access, they are informed that they do not have rights to view the process system at step 1204. If the user does have rights to view the process system, work model explorer 612 performs a further query at step 1206 to determine if there are activities that are orphaned. An activity, such as a process, task or step is said to be orphaned if it is defined in the database but is not associated with a root process or if with a process group. If an orphaned activity is found in the database at step 1206, an exceptions header is generated to be included in the work model explorer.

At step 1208, the groups identified in query 1200 and the exceptions header, if identified at step 1206, are displayed.

At step 1210, the method determines if a command to expand a node has been received. A node will be expanded when the user selects the plus icon next to the node or double clicks on the node. If a command to expand a node has not been received at step 1209, the process remains in step 1209.

If a command to expand a node is received at step 1209, the process continues at step 1210 to determine if the command is to expand a group node. If the command is to expand a group node, work model explorer 612 queries database 608 for all root processes of the selected group at step 1212. At step 1214 the database does a security check to determine if the current user has the rights to view the contents of the selected node. If the user does not have rights to view the contents of the selected node, a security error is generated and the user is informed that they do not have rights to view the contents of the node at step 1216. If the user does have rights to view the contents of the node, the contents returned by the query are displayed at step 1218 and the process returns to step 1209.

If the instruction to expand a node is not applied to a group node at step 1210, the method determines if the command relates to a process or task at step 1220. If the command to expand a node relates to a process or task, work model explorer 612 queries database 608 to identify all item types of the current process or task at step 1222. Database 608 then performs a security check at step 1214 and either tells the user they do not have rights to view the items under the selected process or task at step 1216 or displays the item types of the process or task at step 1218.

If the node selected for expansion is not a process or task at step 1222, it is an item type heading and work model explorer 612 queries all items of that type associated with the current process or task at step 1224. Database 608 performs a security check at step 1214 and tells the user if they do not have rights to view the items under the item type heading at step 1216. If the user does have rights to view the items under the item type heading, the items are displayed at step 1218 and the process returns to step 1209.

Figure 13:
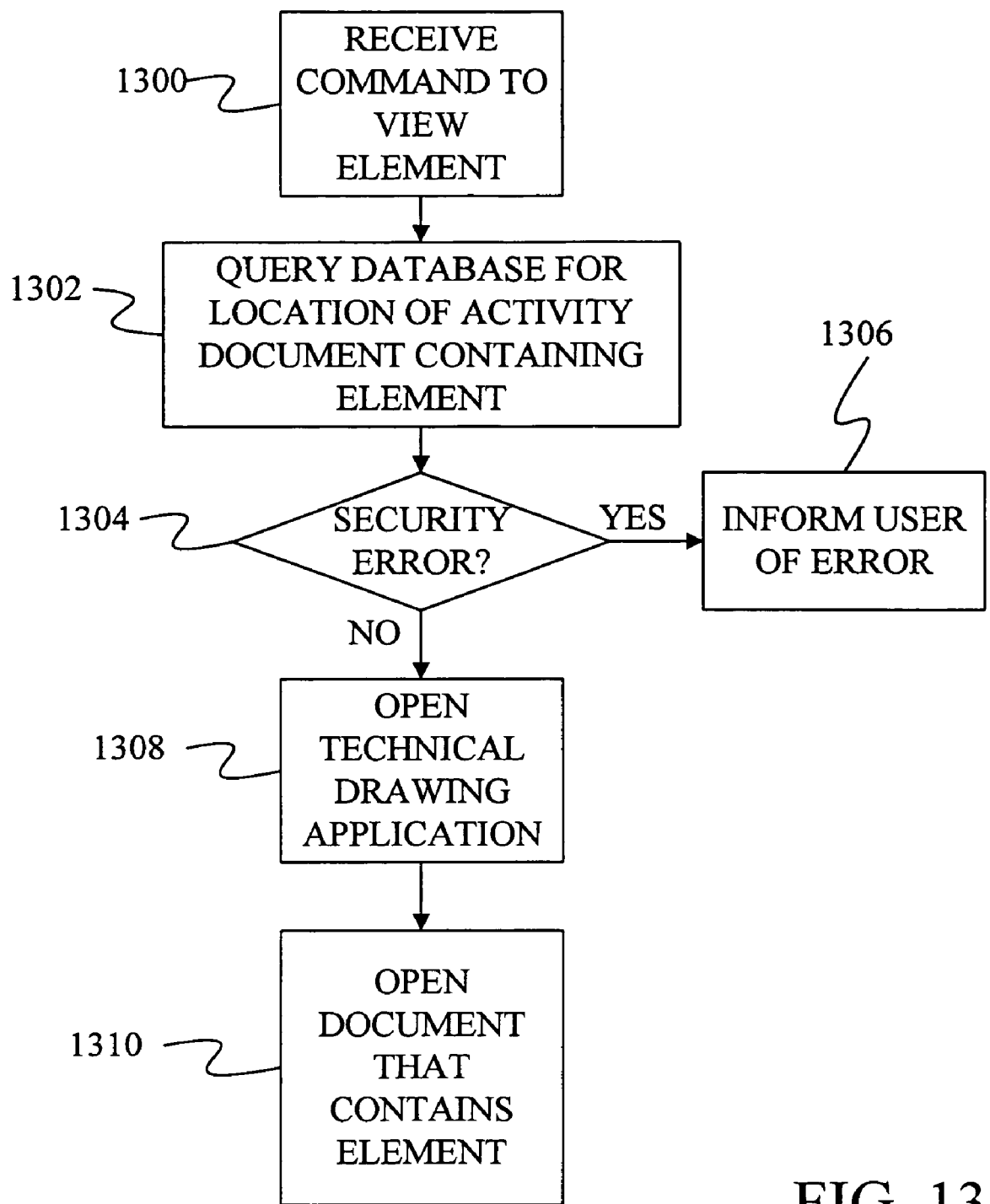
FIG. 13 is a flow diagram of a method of viewing a process element selected from the explorer view.

Users are able to view elements shown in work model explorer 1100 by right clicking on the elements and requesting that they be opened. FIG. 13 shows a flow diagram for viewing an element displayed in the work model explorer. At step 1300, a command to view an element is received. At step 1302, a query is performed on database 608 by work model explorer 612 to determine what document the element is found in and to find the location of that document. At step 1304, database 608 does a security check to determine if the user has the rights to view the document containing the element. If the user does not have rights, a security error is generated and the user is informed that they do not have rights to view the element at step 1306. If the user does have rights to view the element at step 1304, technical drawing application 600 is started at step 1308, if it is not currently running.

The document that contains the element is then opened within the technical drawing application at step 1310. At this point, the user may make changes to the document including changing the metadata of any element in the document. The user can then save the document and the changes to the document as discussed above in FIG. 5.

Figure 14:
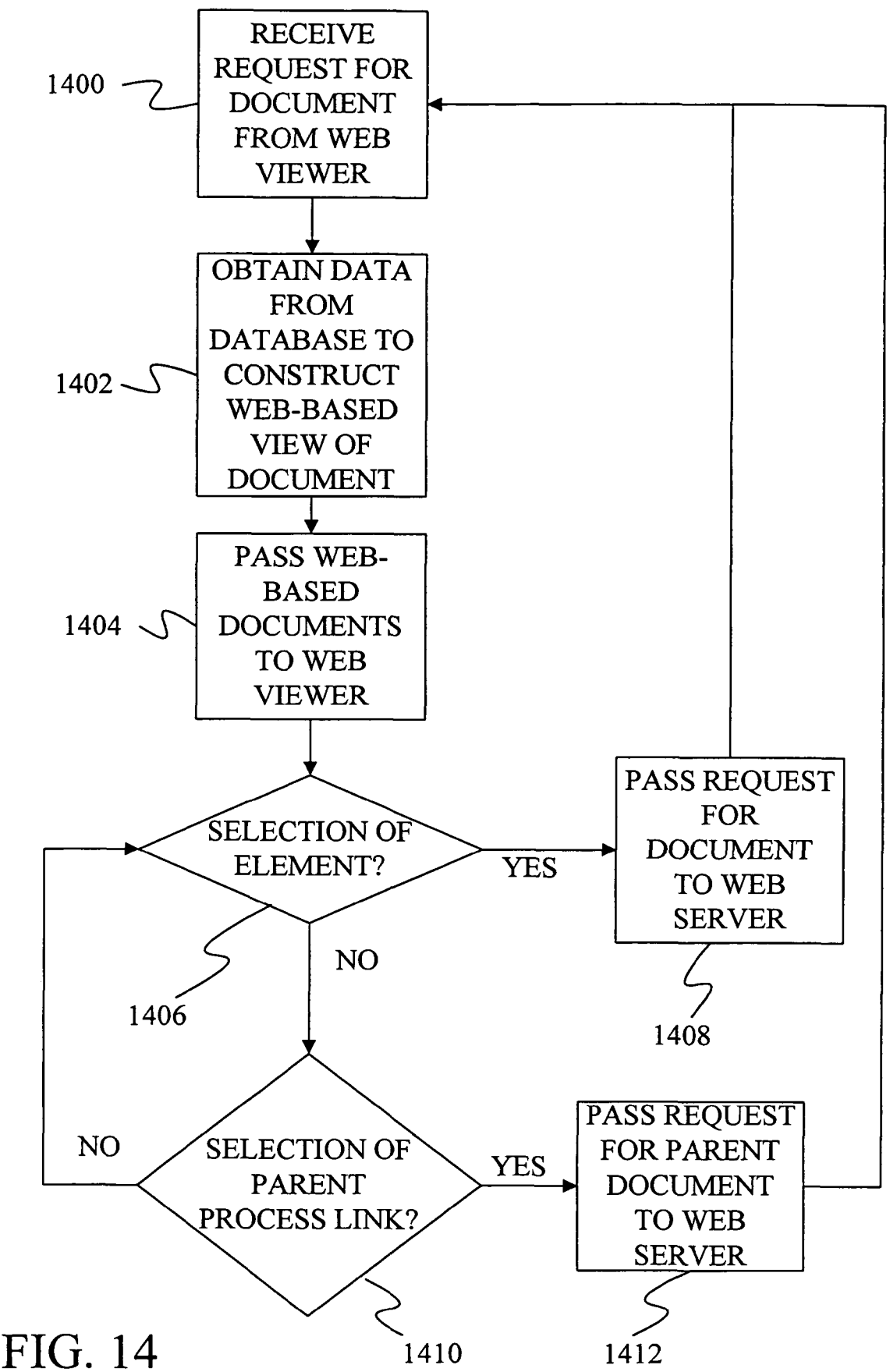
FIG. 14 is a method for viewing process documents across a network.

In certain embodiments, the process documents may be viewed in a static format across a network, such as the Internet. FIG. 14 shows a flow diagram for viewing process documents over a network. At step 1400 a web server 620 receives a request from a web viewer 622 through a network 624 such as the Internet. At step 1402, web server 620 uses data access layer 610 to access database 608 to obtain data to construct a web-based view of the process document. This web-based view of the process document includes links that are associated with sub-processes and tasks, so that when a sub-process or task shown in the web-based view is selected, a request to view the document associated with the sub-process or task is sent to web server 620. At step 1404, the web-based document is passed to web viewer 622 through network 624. At step 1406, if the user of the web viewer selects a process or task, a request to view the document associated with the process or task is passed to web server 620 at step 1408. The process then returns to step 1400 to process the request for the new process document.

Web-based process documents for sub-processes include a link that allows the web viewer to request the document for the parent process of the current sub-process. If the user has not selected a process or task at step 1406, the method determines if the user has selected the link to the parent process at step 1410. The user has selected the link to the parent process, a request to view the parent process is sent to the web server at step 1412. The process then returns to step 1400. If the user has not selected a link to the parent process, the method of FIG. 14 returns to step 1406.

Although steps 1406 and 1410 are shown as sequential steps, they actually occur in parallel, with the method waiting for the selection of either a link to the parent process or a link to a sub-process or task.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   storing a document containing a drawing of an activity in a storage device, the drawing comprising a plurality of elements associated with a process;
   storing the location of the stored document in a database;
   storing at least one property in the database for each element in the drawing;
   storing locations of a plurality of documents containing drawings for a plurality of respective activities in the database and storing at least one property for each element in each drawing;
   storing a structural relationship in the database that describes the structural relationship between at least two elements in the drawing;
   a work model explorer generating a user interface comprising a list of elements found in the process;
   the work model explorer receiving a request to display one of the elements listed in the user interface from a user;
   performing a search of the database based on the request from the user to determine which document contains a particular drawing comprising the element and the location of the document that contains the drawing comprising the element;

performing a security check to see if the user has rights to view the document containing the element; and if the user has rights to view the document containing the element:

the work model explorer starting a technical drawing application that is not currently running;

opening the document in the technical drawing application such that the drawing is displayed on a display device; and receiving a change to metadata of the element in the document in the technical drawing application.

2. The method of claim 1 wherein storing a structural relationship comprises storing an entry for each of a set of flow elements in the drawing, wherein each entry indicates which elements are connected by the flow element.

3. The method of claim 1 wherein storing a structural relationship in the database comprises associating an identifier for the element with an identifier for the activity in the database.

4. The method of claim 3 wherein associating an identifier for an element with an identifier for an activity comprises storing the identifier for the element and the identifier for the activity in a first table in the database and wherein storing a property for the element comprises storing the identifier for the element and the property for the element in a second table in the database.

5. The method of claim 1 wherein the same element appears in a first drawing for a first activity and a second drawing for a second activity and wherein storing a structural relationship comprises storing an association between an identifier for the element and an identifier for the first activity and storing an association between the identifier for the element and an identifier for the second activity.

6. The method of claim 1 further comprising creating the drawing of the activity by placing elements in the drawing and setting properties for the elements.

7. The method of claim 6 wherein setting properties for an element comprises providing values for properties displayed in a user interface.

8. The method of claim 7 wherein the properties for the element are displayed on the user interface when the element is selected while the drawing appears in the user interface.

9. The method of claim 1 further comprising accessing the database to retrieve information to generate a user interface that shows a hierarchical representation of activities and the elements in the activities.

10. A computer storage medium having computer executable instructions that when executed by a processor cause the processor to perform steps comprising:

storing locations of a plurality of documents containing drawings for a plurality of respective activities in the database and storing at least one property for each element in each drawing;

storing a structural relationship in the database that describes the structural relationship between at least two elements in a drawing;

generating a work model explorer user interface comprising a list of elements found in a process associated with one of the drawings;

receiving a command to view one of the elements listed in the user interface from a user through the user interface;

performing a search of the database based on the request from the user to determine which document contains a particular drawing comprising the element and the location of the document that contains the drawing comprising the element;

performing a security check to see if the user has rights to view the document containing the element; and if the user has rights to view the document containing the element:

a work model explorer starting a technical drawing application that is not currently running;

opening the document in the technical drawing application such that the drawing is displayed on a display device; and receiving a change to metadata of the element in the document in the technical drawing application.

11. The computer storage medium of claim 10 wherein storing a structural relationship comprises storing an entry for each of a set of flow elements in the drawing, wherein each entry indicates which elements are connected by the flow element.

12. The computer storage medium of claim 10 wherein storing a structural relationship in the database comprises associating an identifier for the element with an identifier for the activity in the database.

13. The computer storage medium of claim 10 wherein the same element appears in a first drawing for a first activity and a second drawing for a second activity and wherein storing a structural relationship comprises storing an association between an identifier for the element and an identifier for the first activity and storing an association between the identifier for the element and an identifier for the second activity.

14. The computer storage medium of claim 12 wherein associating an identifier for an element with an identifier for an activity comprises storing the identifier for the element and the identifier for the activity in a first table in the database and wherein storing a property for the element comprises storing the identifier for the element and the property for the element in a second table in the database.

15. The computer storage medium of claim 10 further comprising creating the drawing of the activity by placing elements in the drawing and setting properties for the elements.

16. The computer storage medium of claim 15 wherein setting properties for an element comprises providing values for properties displayed in a user interface.

17. The computer storage medium of claim 16 wherein the properties for the element are displayed on the user interface when the element is selected while the drawing appears in the user interface.

18. The computer storage medium of claim 10 wherein the work model explorer user interface shows a hierarchical representation of activities and the elements in the activities.

19. A system comprising:

a memory storing a drawing document, the drawing document comprising a plurality of elements associated with a process;

a database containing:

the locations of a plurality of stored drawing documents containing drawings for a plurality of respective activities, at least one property for each element in each drawing document;

a structural relationship between at least two elements in each drawing;

a work model explorer:
   generating a user interface comprising a list of elements found in the process;
   receiving a request to display one of the elements listed in the user interface from a user;
   performing a search of the database based on the request from the user to determine which drawing document contains the element and the location of the drawing document; and
   if the user has rights to view the document containing the element, starting a technical drawing application that is not currently running; and
   the technical drawing application opening the drawing document such that the drawing document is displayed and receiving a change to metadata of the element in the drawing document.

* * * * *